(12) United States Patent
Kawai

(10) Patent No.: US 7,724,299 B2
(45) Date of Patent: *May 25, 2010

(54) DUST REMOVAL CAMERA

(75) Inventor: Sumio Kawai, Hachioji (JP)

(73) Assignee: Olympus Corporation, Tokyo (JP)

( * ) Notice: Subject to any disclaimer, the term of this patent is extended or adjusted under 35 U.S.C. 154(b) by 417 days.

This patent is subject to a terminal disclaimer.

(21) Appl. No.: 11/731,625

(22) Filed: Mar. 30, 2007

(65) Prior Publication Data

US 2007/0171295 A1 Jul. 26, 2007

Related U.S. Application Data

(63) Continuation of application No. 11/210,948, filed on Aug. 24, 2005, now Pat. No. 7,609,315, which is a continuation of application No. 10/037,353, filed on Dec. 21, 2001, now Pat. No. 7,006,138.

(30) Foreign Application Priority Data

Dec. 28, 2000 (JP) ............................. 2000-401291

(51) Int. Cl.
*H04N 5/225* (2006.01)
(52) U.S. Cl. .................................. 348/340; 348/208.11
(58) Field of Classification Search ................. 348/373, 348/374, 351, 335, 340, 208.11, 205, 375, 348/376
See application file for complete search history.

(56) References Cited

U.S. PATENT DOCUMENTS

| | | | |
|---|---|---|---|
| 4,387,973 A | 6/1983 | Martin | |
| 4,441,796 A | 4/1984 | Shaw | |
| 4,841,387 A | 6/1989 | Rindfuss | |
| 4,920,420 A | 4/1990 | Sano et al. | |
| 5,170,288 A | 12/1992 | Imaizumi et al. | |
| 5,910,700 A | 6/1999 | Crotzer et al. | |
| 6,078,438 A | 6/2000 | Shibata et al. | |
| 6,163,340 A | 12/2000 | Yasuda | |
| 6,327,085 B1* | 12/2001 | Osawa et al. | ................ 359/495 |
| 6,590,613 B2 | 7/2003 | Yasuda | |
| 6,819,358 B1 | 11/2004 | Kagle et al. | |

(Continued)

FOREIGN PATENT DOCUMENTS

JP 57-078032 5/1982

(Continued)

OTHER PUBLICATIONS

Machine English Translation of JP 07-151946 A (JP document published on Jun. 16, 1995).*

(Continued)

*Primary Examiner*—Lin Ye
*Assistant Examiner*—Nelson D. Hernández Hernández
(74) *Attorney, Agent, or Firm*—Volpe and Koenig, P.C.

(57) ABSTRACT

A dust removal camera which has an image pickup sensor which converts an optical image into an electric signal, a shutter which opens/closes an optical path to the image pickup sensor, an optical plate provided between the image pickup sensor and the shutter, and rectangularly formed, and a piezoelectric body provided to extend along an end portion of a surface of the optical plate, and to vibrate the optical plate.

7 Claims, 4 Drawing Sheets

U.S. PATENT DOCUMENTS

| | | |
|---|---|---|
| 2001/0053288 A1 | 12/2001 | Ito et al. |
| 2002/0171751 A1 | 11/2002 | Ohkawara |
| 2003/0146980 A1 | 8/2003 | Shimada |
| 2003/0202114 A1 | 10/2003 | Takizawa et al. |
| 2003/0214588 A1 | 11/2003 | Takizawa et al. |
| 2003/0218685 A1 | 11/2003 | Kawai |
| 2003/1214599 | 11/2003 | Ito et al. |
| 2004/0047625 A1 | 3/2004 | Ito et al. |
| 2004/0090549 A1 | 5/2004 | Takizawa et al. |
| 2004/0169761 A1 | 9/2004 | Kawai et al. |
| 2004/0227837 A1 | 11/2004 | Ito |
| 2004/0263669 A1 | 12/2004 | Kobayashi |
| 2005/0088563 A1 | 4/2005 | Ito et al. |

FOREIGN PATENT DOCUMENTS

| | | |
|---|---|---|
| JP | 62-165127 | 7/1987 |
| JP | 01-230016 | 9/1989 |
| JP | 03-244281 | 10/1991 |
| JP | 04-081253 | 3/1992 |
| JP | 05-213286 | 8/1993 |
| JP | 07-151946 | 6/1995 |
| JP | 07-322153 | 12/1995 |
| JP | 08079633 | 3/1996 |
| JP | 08-285679 | 11/1996 |
| JP | 09-130654 | 5/1997 |
| JP | 11243187 | 9/1999 |
| JP | 2000-029132 | 1/2000 |
| JP | 2000-330054 | 11/2000 |
| JP | 2001-298640 | 10/2001 |
| JP | 2001-359287 | 12/2001 |
| JP | 2002-229110 | 8/2002 |

OTHER PUBLICATIONS

Office Action dated Dec. 9, 2008 from corresponding Japanese Patent Application No. 2000-401291 along with English translation.

Office Action dated Dec. 9, 2008 from corresponding Japanese Patent Application No. 2007-340227 along with English translation.

Office Action dated Dec. 9, 2008 from corresponding Japanese Patent Application No. 2007-340228 along with English translation.

Office Action dated Dec. 9, 2008 from corresponding Japanese Patent Application No. 2007-340229 along with English translation.

* cited by examiner

Gravity direction
↓ Dust

DUST REMOVAL CAMERA

CROSS REFERENCE TO RELATED APPLICATIONS

This application is a continuation of U.S. patent application Ser. No. 11/210,948, filed on Aug. 24, 2005, which is a continuation of U.S. patent application Ser. No. 10/037,353, filed on Dec. 21, 2001, now U.S. Pat. No. 7,006,138, which claims the benefit of priority from Japanese Patent Application No. 2000-401291, filed Dec. 28, 2000, which are incorporated by reference as if fully set forth.

BACKGROUND OF THE INVENTION

1. Field of the Invention

The present invention relates to a camera with an image pickup device, and in particular to a camera where dust adhering to an interior of the camera can be removed.

2. Description of the Related Art

Conventionally, a relatively large pixel pitch has been applied to an image pickup device. In recent years, however, in a case that a small sized image pickup device with one million or more pixels is used in a camera, there occurs a problem that the pixel pitch becomes fine and a shadow of dust adhering to an optical element face in the vicinity of an image pickup face of the image pickup device is picked up by the image pickup device so that the image quality of the obtained photograph is considerably affected by the shadow, which results in deterioration of image quality.

As one of methods for solving the problem, such a structure is employed that an image pickup device section is sealed as closely as possible, or as another of the methods, such a procedure is employed that in a single-lens reflex camera of a lens exchangeable type, a lens is detached from a main body of the camera, and an image pickup device section is exposed using a special operation mode so that dust adhering to the image pickup device section is blown out by a blower or the like.

In the former method, however, in a case of a camera having a mechanism with a mechanical focal-plane shutter, the shutter itself must be closed tightly or sealed and a sealing structure therefore is much complicated, which results in large size. Also, even when the outside of the shutter is sealed, there occurs a problem that a surface of the shutter is worn due to sliding operation of a plane of the mechanical shutter to generate dust, and the generated dust adheres to the image pickup device section. Also, in a case of a shutter constituted so as to control the image pickup device electrically instead of the mechanical shutter, there is a drawback that a time required for driving the image pickup device is prolonged due to a shutter control, which causes increase in temperature of the image pickup device so that the image quality of a photograph obtained by the camera or a life of a battery cell in the camera is reduced.

Furthermore, in the another method, such a complicated operation is required that an exchange lens is detached for blowing dust, or the image pickup device is exposed in a special mode. Also, when the mechanical shutter is used, the shutter must be put in an opened state during removal of dust. At this case, when the shutter is closed unexpectedly due to voltage shortage or the like, a blower for cleaning and the shutter plane are brought into contact with each other so that the shutter may be damaged.

BRIEF SUMMARY OF THE INVENTION

In view of the above circumstances, an object of the present invention is to provide a camera having a dustproof mechanism for an image pickup device which is effective against dust generated after assembling the camera, where the dustproof mechanism can be made simple and small-sized by constituting a sealed portion of an image pickup device section in a small size.

According to an aspect of the present invention, there is provided a dust removal camera having an image pickup sensor which converts an optical image into an electric signal; a shutter which opens/closes an optical path to the image pickup sensor; an optical plate provided between the image pickup sensor and the shutter, and rectangularly formed; and a piezoelectric body provided to extend along an end portion of a surface of the optical plate, and to vibrate the optical plate.

According to another aspect of the invention, there is provided a dust removal camera having an image pickup optical system which picks up an optical image of an object; an image pickup sensor which converts the optical image into an electric signal; a shutter which opens/closes an optical path to the image pickup sensor; an optical plate provided between the image pickup sensor and the shutter, and rectangularly formed; and a piezoelectric body provided to extend along an end portion of a surface of the optical plate, and to vibrate the optical plate.

According to still another aspect of the invention, there is provided a dust removal method. The method includes applying a periodic voltage to a piezoelectric body provided to extend along an end portion of a surface of an optical plate which is substantially rectangular, and which is located in front of an image pickup element; and causing vibration to be created at the surface of the optical plate by applying the periodic voltage of the piezoelectric body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained below with reference to the drawings.

Figure 1:
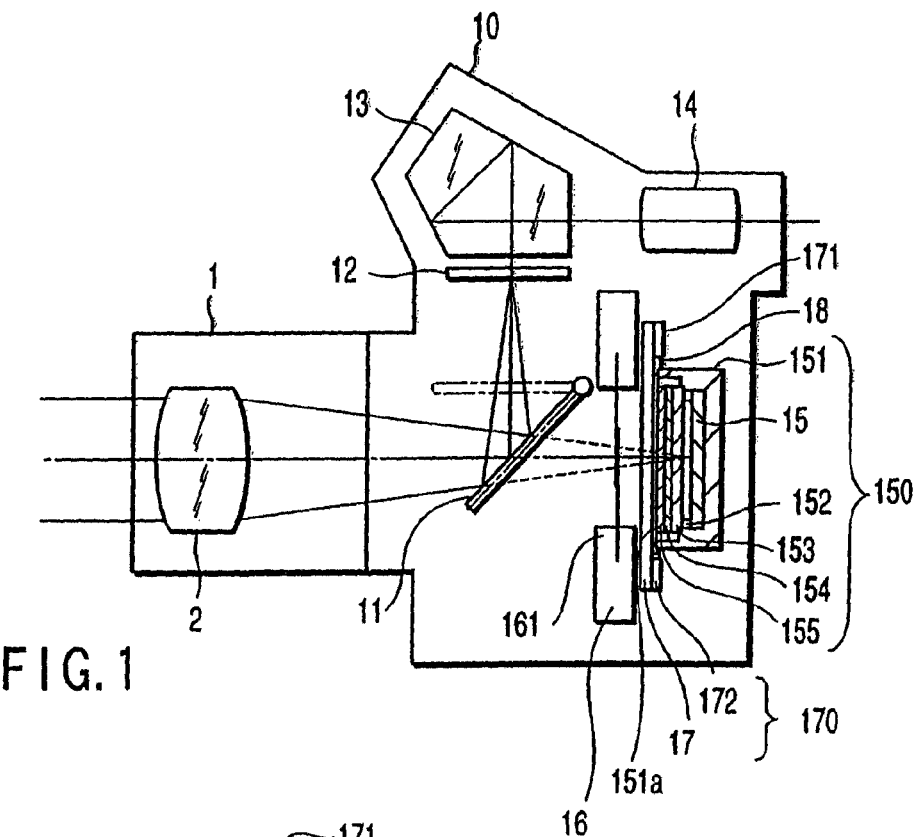
FIG. 1 is a sectional view of a camera according to a first embodiment of the present invention.

FIG. 1 is a sectional view of a camera showing a first embodiment of the present invention, where only a main portion of the camera is shown. A type of a camera used herein is a single-eye reflex type camera of a lens exchange type, which comprises a lens assembly 1 and a camera body 10. The lens assembly 1 and the camera body 10 are coupled to each other, for example by a coupling mechanism such as a bayonet or the like. Also, the lens system 1 has an image formation lens system 2, and an image formation position can be adjusted by moving the entire image formation lens system 2 or one or some lenses constituting the image formation lens system 2 in a direction of an optical axis. The lens assembly 1 is also provided with a focus adjusting mechanism (not shown).

In FIG. 1, also, light rays of an object image passing through the image formation lens system 2 are turned upwardly by a mirror 11 and an optical image of the object image is formed on a screen 12. The optical image can be observed via a roof prism from an eye piece 14.

On the other hand, an image pickup face of a CCD (Charge Coupled Device) 15 serving as an image pickup device in the camera according to the embodiment, which is a photoelectric transfer device, is arranged at a position optically equivalent to the image formation face of the screen 12. The CCD 15 is held in a holder 151 which is a holding member such that the image pickup face faces an opening portion 151a of the holder 151, and a support portion (not shown) of the holder 151 is fixed to the camera body 10. Also, a mask 152 having a rectangular opening is provided in front of the CCD 15 and it defines a light receiving range of a light receiving face of the CCD 15. Furthermore, a filter H 153 which is an optical low pass filter for a reference direction, a filter V 154 which is an optical low pass filter for a direction perpendicular to the reference direction, and a filter R 155 which is an infrared ray insulating filter are respectively provided in front of the CCD 15.

In a conventional camera, the above-mentioned structure is employed, where a front face of the filter R 155 is exposed to a space on the side of a shutter 16. Accordingly, dust which has invaded into an inside of the body 10 or has been generated in the inside adheres to an exposed face of the filter R 155, and the shadow of the adhered dust is not blurred sufficiently because the exposed face and the image formation face of the CCD 15, so that the shadow is recorded as an image projected on the image pickup face.

In this embodiment, a glass plate 17 which is an optical device is fixed to the holder 151 via a supporting body 18 so as to cover the opening portion 151a, and the filter R 155 is sealed or closed tightly by sealing a space between the glass plate 17 and the supporting body with a visco-elastic filler.

This is because, by using the visco-elastic filler, vibrations of the glass plate 17 can be prevented from being transmitted to another member and vibrations of the glass plate 17 itself are not obstructed. In this manner, since the glass plate 17 is arranged so as to cover the opening portion 151a of the holder 151, a space between the CCD 15 and the glass plate 17 is sealed by the holder 151 and the glass plate 17 so that dust is prevented from invading into the space from the outside. Accordingly, by assembling these members in a state where dust is removed from these members, the face of the glass plate 17 positioned on the side of the filter R 155 is prevented from being adhered with dust. Then, piezoelectric bodies a 171 and b 172 are fixed to upper and lower portions of a back face of the glass plate 17 to constitute a dustproof device 170.

Figure 2A:
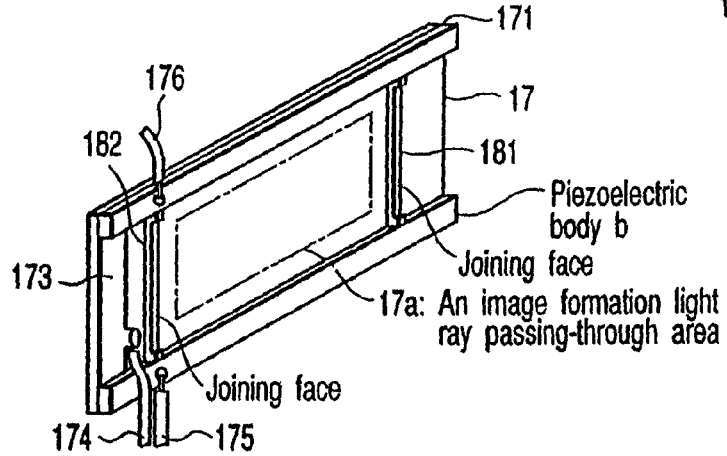
FIG. 2A is a perspective view of a dustproof device section according to the first embodiment and FIG. 2B is a pattern diagram of an electric terminal for ground of the dustproof device section shown in FIG. 2A.
Figure 2B:
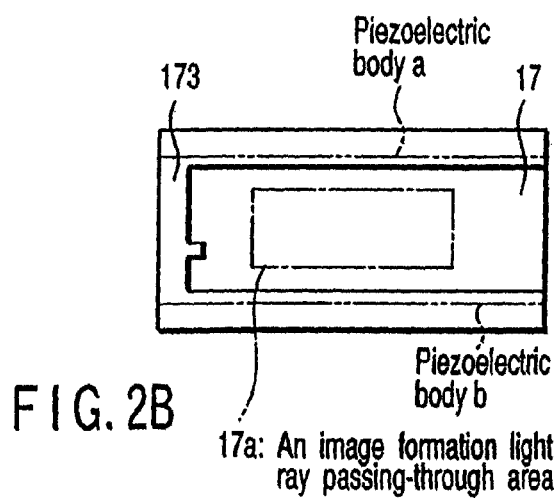

Next, FIG. 2A is a perspective view of a dustproof device section, and FIG. 2B shows a pattern of an electric terminal 173 providing a ground for the piezoelectric bodies provided to the glass plate 17 in a fixing manner. An image formation light ray passing-through area 17a through which a light bundle from the image formation lens system 2 passes is formed at almost a central portion of the glass plate 17. The light bundle from the image formation lens system 2 passes through the image formation light ray passing-through area 17a to be incident on the CCD 15. Also, supporting bodies a 182 and b 181 made of material such as rubber having a vibration absorbing characteristic are fixed to left and right portions of the glass plate 17. Each supporting body is provided with a joining portion recessed towards the side of the glass plate 17 by one step size, left and right portion of the front face of the holder 151 are received in the joining portion, and the holder 151 and the supporting body are fixed to each other at the joining face. Also, a lead wire G 174 connecting to the ground is welded to the electric terminal 173. Furthermore, the piezoelectric bodies a and b are respectively provided with a lead wire Sa 176 and a lead wire Sb 175, and they are applied with a cyclic voltage. Also, the electric terminal 173 may be formed by adhering an electric conductive thin film to the glass plate 17 or it may be formed by performing such a vapor deposition as a sputtering process or an electroless plating on the glass plate 17.

Figure 3A:
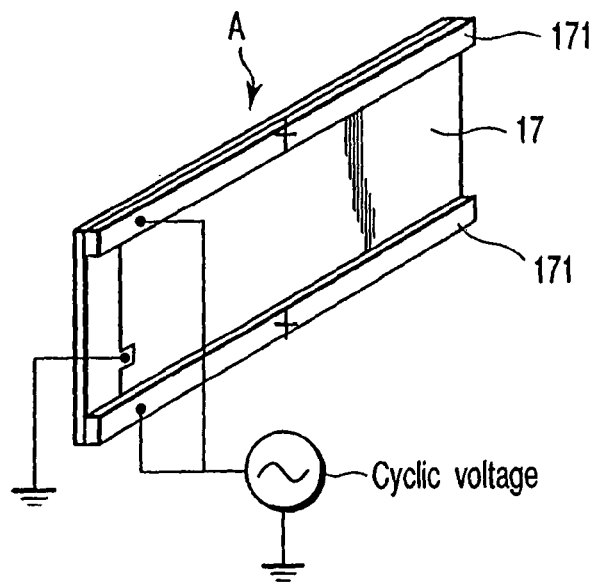
FIG. 3A is a circuit diagram for applying a signal to a dustproof device according to the first embodiment.

Next, FIG. 3A shows a schematic circuit diagram for applying a signal to a dustproof device. As shown in FIG. 3A, the piezoelectric body a and the piezoelectric body b are polarized to the same orientation in the direction of the thickness of the piezoelectric body (a direction of the optical axis of the image formation lens 2) and cyclic voltage is applied to faces of the surface sides of the piezoelectric bodies. Such a cyclic signal may be a rectangular wave or a sine wave.

Figure 3B:
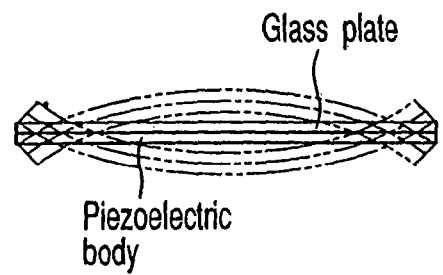
FIG. 3B is a diagram of a glass plate and a piezoelectric member of the dustproof device viewed from a direction of arrow A in FIG. 3A.

Next, FIG. 3B is a view of a state of the dustproof device obtained when a cyclic signal is applied to the dustproof device, which is viewed from arrow A in FIG. 3A. As shown in FIG. 3B, a solid line shows a case where a voltage is not applied to the dustproof device, a chain on the lower side shows a case where the piezoelectric bodies are stretched by applying + (plus) voltage to the piezoelectric bodies, and a chain line on the upper side shows a case where the piezoelectric bodies are shrunk by applying − (minus) voltage to the piezoelectric bodies.

Figure 3C:
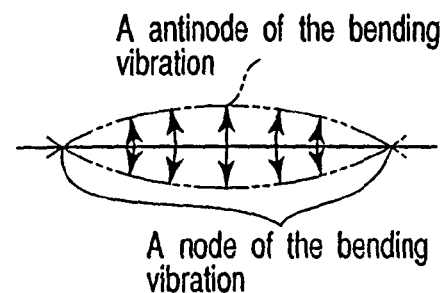
FIG. 3C is a diagram showing bending vibrations of the glass plate shown in FIG. 3B.

Next, FIG. 3C shows bending vibrations occurring at a face of the glass plate 17 of the dustproof device which is vibrating as shown in FIG. 3B, which is positioned on the side of the shutter 16. The arrow shows a locus of a mass point on a surface of the glass plate 17. The mass point on an antinode of the bending vibration is vibrated up and down, and it has a maximum amplitude. Also, the amplitude of the mass point is zero at a position of a node of the bending vibration where the mass point experiences only a rotational motion. Between the antinode and a node of the bending vibration, the mass point and a portion positioned from the mass point close to the node vibrate about the node in an arc shape.

Next, FIGS. 5A to 5I show the behaviors of a dust according to a time sequence in a state that the dust adheres to a surface of a glass plate before a surface of the glass plate vibrates. FIGS. 5A to 5I show a case that, in addition to the vibration of the glass plate, such a force as gravity acts on the dust in the direction of the plate thickness of the glass plate.

Figure 5A:
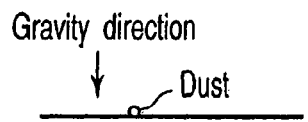
FIGS. 5A to 5I are diagrams showing behaviors of dust adhering to a surface of a vibrating glass plate according to the first embodiment of the present invention.
Figure 5B:
Figure 5C:
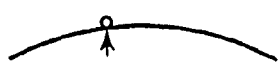
Figure 5D:
Figure 5E:
Figure 5F:
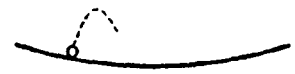
Figure 5G:
Figure 5H:
Figure 5I:
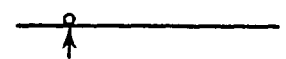

First, FIG. 5A shows a state that a dust adheres to a surface of a glass plate before the surface vibrates. In a state shown in FIG. 5B, the surface starts to vibrate and a force shown with an arrow is applied from the surface to the dust. In a state shown in FIG. 5C, the force acting on the dust becomes weak but a force shown with an arrow is applied on the dust. In a state shown in FIG. 5D, a vibration direction is reversed from the state shown in FIG. 5C, and when an inertial force acting on the dust from the surface exceeds an adhering force of the dust to the surface and the gravity, the dust separates from the surface to continue inertial movement between the state shown in FIG. 5C and the state shown in FIG. 5D. Then, broken lines shown in FIGS. 5D to 5F show movement loci of the dust when a downward force (gravity, electrostatic force or the like) in these figures is applied to the dust. Then, as shown in FIG. 5F, the dust is consequently moved leftward from the state shown in FIG. 5A.

The reason why the dust is moved in this manner is that the vibration of the mass point shown in FIG. 3C has a horizontal component. Also, in the course from a state shown in FIG. 5H to 5I, the dust is applied with a force from the surface, again.

In this manner, FIGS. 5A to 5I show movement of a piece of dust during one cycle of the vibration, but when the vibration is further continued, dust gathers together at the node of vibration shown in FIG. 3C. Also, even when dust adheres to the position of the antinode of vibration, since it will be impossible that the dust is formed in a complete sphere and its center of gravity is positioned at the antinode of vibration accurately, when the dust separates from the surface and it adheres to the surface again, the dust deviates from the position of the antinode so that it is finally moved to the node of vibration. Accordingly, when bending vibration is generated such that a node of vibration is positioned so as to be deviated from the image formation light ray passing-through area, dust can be removed from the image formation light ray passing-through area. Also, in the present invention, such a constitution is employed that respective nodes of vibration are supported by the supporting body a and the supporting body b. With such a constitution, since each node is supported at a position having amplitude of zero, an effective supporting method can be provided which does not prevent bending vibration. Further, the bending vibration can produce a large amplitude at a signal of the lowest voltage when resonance occurs. The resonance frequency at this time is determined according to the shape and the material quality of the dustproof device, a supporting method, and a vibration mode.

Now, assuming that the dustproof device has a simple rectangular plate, the length of the long side of the plate is l, the plate thickness is h, the longitudinal elastic coefficient of the plate is E, the density of the plate is ρ, and a primary bending vibration as shown in FIG. 3C is produced through a free support serving as the support, the resonance frequency f is:

$$f = \frac{1.133\pi}{l^2}\sqrt{\frac{Eh^2}{12\rho}}$$

In FIGS. 5A to 5I, the force of gravity is applied to the face in a vertical direction to the face, but when the force of gravity is applied in an in-plane direction, dust moves in a direction of the node of the bending vibration and it also moves in a direction of the gravity, so that it is removed from the image formation light ray passing-through area.

Thus, in this embodiment, a voltage is applied at a frequency at which the glass plate 17 which is the dustproof device is resonated.

Figure 4:
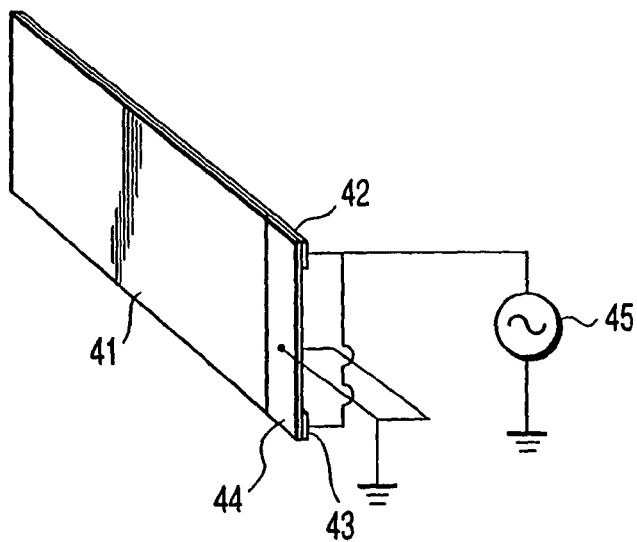
FIG. 4 is a diagram showing an anti-static constitution of a transparent electrode according to the first embodiment of the present invention.

By producing a primary bending vibration in the glass plate 17 which is the dustproof device in the above manner, dust adhering to a surface of the glass plate 17 can be removed from the surface. However, in a case that a surface of the glass plate 17 is charged with static electricity, dust which has adhered on the surface of the glass plate 17 is attracted on the surface of the glass plate 17 by static electricity. Accordingly, when an attracting force is very strong, dust on the surface of the glass plate 17 may not be removed therefrom. In order to solve this problem, as shown in FIG. 4, a transparent electrode 41 and an electric terminal 44 conductive to the transparent electrode 41 are formed on the surface of the glass plate 17, and the transparent electrode 41 is grounded through the electric terminal 44 so that the glass plate 17 can be prevented from being charged. Then, the piezoelectric bodies 42, 43 are constituted on a surface of the glass plate 17 which is positioned on the side of the CCD 15, as shown in FIG. 3A, and such a vibration as mentioned above is applied to the glass plate 17, so that dust adhering on the surface of the glass plate 17 can be removed from the surface.

As mentioned above, by providing an anti-static means for preventing the surface of the glass plate 17 from being charged, more effective dust removing effect can be achieved. Also, besides such a constitution that the surface of the glass plate 17 is grounded for preventing the charging, an effect similar to the case of grounding can be achieved by applying an anti-static coating on the surface of the glass plate 17.

Figure 6:
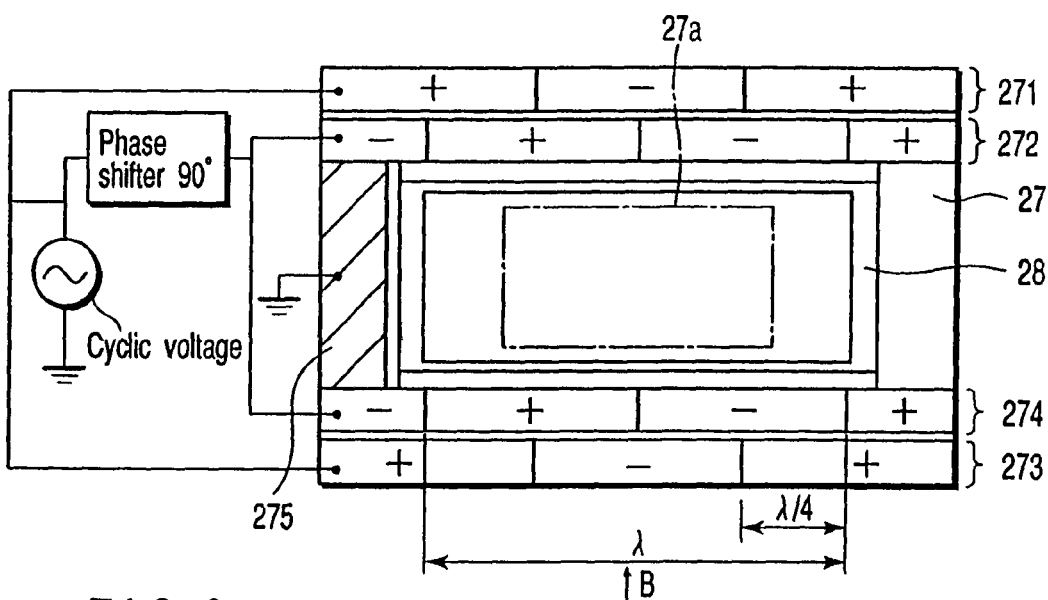
FIG. 6 is a diagram showing a dustproof device section according to a second embodiment of the present invention.

Next, FIG. 6 shows a second embodiment of the present invention. As shown in FIG. 6, a dustproof device generating a progressive wave on a glass plate 27 is constitute by fixing piezoelectric bodies a1 271, a2 272, b1 273 and b2 274 on the glass plate 27 and providing an electric terminal for grounding between each piezoelectric body and the glass plate. Each piezoelectric body has sections (expressed by symbols + and −) with different polarization directions which are arranged alternately in a horizontal direction. Assuming that horizontal polarization arrangements of the piezoelectric body a1 271 and the piezoelectric body b1 273 are the same, and a section length of the + section and − section is defined as λ, the remaining piezoelectric bodies a2 272 and b2 274 are arranged such that they are shifted from the arrangement positions of the two piezoelectric bodies a1 and b1 by λ/4 in a horizontal direction.

Figure 7:
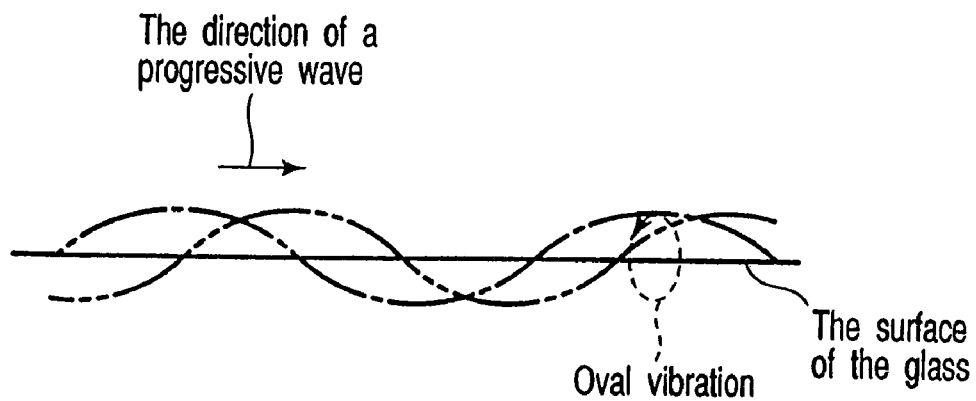
FIG. 7 is a diagram of a progressive wave according to the second embodiment of the present invention.

Cyclic voltages having the same phase are applied to the piezoelectric bodies a1 and b1 from an oscillator, respectively, while cyclic voltages whose phases have been shifted by 90° through a 90° phase shifter are applied to the piezoelectric bodies a2 272 and b2 274 from the oscillator. With such a configuration, as shown in FIG. 7, a progressive wave with a wavelength λ is generated on the surface of the glass plate 27. FIG. 7 is a diagram of the surface of the glass plate 27 shown in FIG. 6, which is observed when the surface is viewed from a direction of arrow B, where a one-dotted line denotes the shape of the surface just after a voltage is applied and a double-dotted line denotes an aspect where a bending vibration wave progresses in a horizontal and rightward direction according to a time lapse.

As mentioned above, when a progressive wave occurs on the glass plate, an oval vibration (including a circular motion) in a counterclockwise direction occurs at any mass point, as shown in FIG. 7. Since there is a leftward and horizontal component in the oval vibration, all dust adhering to a surface of the glass plate are conveyed to the left side of the glass plate.

In the second embodiment of the present invention, since dust is collected to one side of the glass plate, disposition of the collected dust can be made more simply than that in the first embodiment. Also, since the amplitude of the oval vibration is the same at any portion of the glass plate, a force for removing dust becomes uniform over the entire surface of the glass plate. Also, in a case of the second embodiment, the amplitude of a progressive wave can be made large by resonating the bending vibration, so that an inertial force for removing dust can be increased. Furthermore, as compared with the first embodiment, the second embodiment of the invention has a merit that, since a vibration having a wavelength of about ⅓ the wavelength of the first embodiment is used, it exceeds a audible range so that operational sound such as noise is not heard. Also, as another embodiment, such a constitution can be employed that a progressive wave shown in FIG. 6 is not produced in a direction of the longitudinal side of the rectangular glass plate but it is produced in a direction of the short side thereof. In this case, since the length to be vibrated is shorter than that in the case that the progressive wave is produced in the direction of the longitudinal side, a further short wavelength can be employed. Also, as still another embodiment, such a constitution can be employed that a progressive wave is produced in an orthogonal direction of the rectangular glass plate and dust is collected at a corner of the glass plate, so that collection or recovery of the dust can be made easy.

Figure 8:
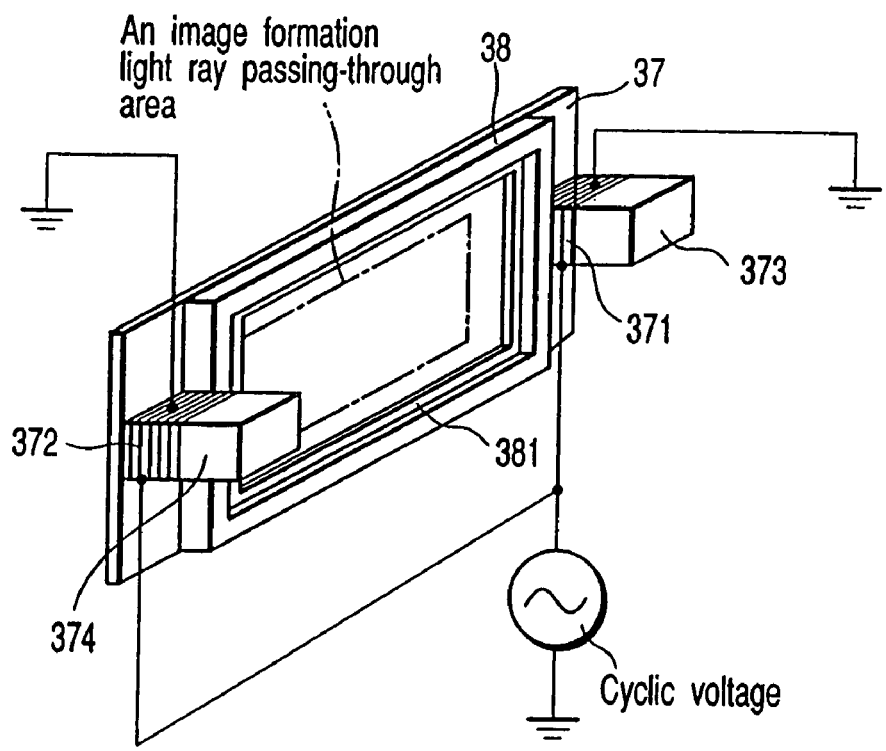
FIG. 8 is a diagram showing a dustproof device section according to the second embodiment of the present invention.

Next, FIG. 8 is a perspective view of a dustproof device of a third embodiment of the present invention. A supporting body 38 formed of a rubber having a vibration damping property or the like is fixed to a glass plate 37 and a front face of a holder 151 (not shown) is bonded to a holder butting face 381 in a butting manner therewith. A laminated piezoelectric body a 371 and a laminated piezoelectric body b 372 are fixed to the glass plate 37 outside the supporting body 38, and the respective laminated piezoelectric bodies are fixed with a weight a 373 and a weight b 374 made of material having a relatively large specific gravity, such as, for example, tungsten, copper, or iron.

Cyclic voltage is applied to each laminated piezoelectric body from an oscillator and each of the weights a 373 and b 374 is vibrated in a direction of an optical axis of a lens. The glass plate 37 can be vibrated in the direction of the optical axis by reaction force of the weight. Dust on the surface of the glass plate can be released from the surface by the vibration of the glass plate, so that, when vibration is applied to the glass plate in an in-plane direction in which the gravity acts, dust is removed in a direction in which the gravity acts. Also, such a constitution can be employed that an air flow is produced simultaneously with application of the vibration instead of the gravity so that dust is removed by action of the air flow. Any vibration which can achieve a similar effect can be employed in this invention.

In the dustproof device of the third embodiment, the dustproof device of the first embodiment can be formed by attaching a laminated piezoelectric body or a dustproof device in the vicinity of the antinode of the bending vibration of the first embodiment and oscillating the oscillator at a resonance frequency. In this case, as the position where the laminated piezoelectric body is attached, any position other than the position of a node of the bending vibration can be selected. However, a bending vibration can be produced more effectively by attaching the laminated piezoelectric body in the vicinity of the antinode. Similarly, even in a case that laminated piezoelectric bodies with a weight are fixed to positions which are shifted each λ/4 in a horizontal direction and a phase is shifted by 90° in a time manner, when a cyclic voltage of a resonance frequency of the above-mentioned bending vibration (a bending vibration of 1.5 wavelength in a standing wave) is applied, the bending progressive wave shown in FIG. 7 occurs in the glass plate.

Even in the second and third embodiments thus configured, anti-static means such as explained in the first embodiment is provided, so that an effect for removing dust can be enhanced.

Further, the following aspects can be considered.

ADDITION OF VARIOUS ASPECTS

1. According to a first aspect of the present invention, there is provided a camera comprising: an image pickup optical system for forming an optical image of an object; a photoelectric converting device for converting the optical image to an electric signal; a holding member which holds the photoelectric transfer device and has an opening portion which guides light from the image pickup optical system to the photo-electric transfer device; an optical device which covers the opening portion and seals the photoelectric transfer device; and a vibration generating device which vibrates the optical device, wherein the optical device is attached to the holding member in the vicinity of a node of vibration produced by the vibration generating means.

2. According to a second aspect of the invention, there is provided a camera according to the first aspect, where the optical device is a low-pass filter.

3. According to a third aspect of the invention, there is provided a camera according to the first aspect, wherein the optical device is an infrared isolating filter.

4. According to a fourth aspect of the invention, there is provided a camera according to the first aspect, further comprising a light permeable electrode formed on a surface of the optical device opposed to the photoelectric converting device; and grounding means which is electrically connected to the electrode to prevent the surface of the optical device from being charged.

5. According to a fifth aspect of the invention, there is provided a camera according to the first aspect, wherein the optical device has a rectangular shape, and opposed sides of one of two sets are fixed to the holding member while adhesive with elasticity is filled in a space between opposed sides of the other of two sets and the holding member.

6. According to a sixth aspect of the invention, there is a camera according to the first aspect, wherein the node of vibration is positioned outside an effective permeable range of the light permeable electrode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dust removal camera comprising:

an image pickup sensor for converting an optical image into an electric signal;

a shutter for opening/closing an optical path to the image pickup sensor;

a substantially rectangular-shaped optical plate provided between the image pickup sensor and the shutter and configured to enable an image forming light ray to pass through a given portion of the optical plate; and piezoelectric bodies provided on a portion of a surface of the optical plate that is outside of said given portion, said piezoelectric bodies facing toward said pickup sensor and being configured to generate oscillating waves in said given portion due to vibration of the of said piezoelectric bodies.

2. The dust removal camera according to claim 1, wherein the optical plate is an infrared cutoff filter.

3. The dust removal camera according to claim 1, wherein the optical plate is a low pass filter.

4. The dust removal camera according to claim 1, wherein the optical plate is electrically grounded.

5. The dust removal camera according to claim 1, which further comprises a transparent electrode formed on the optical plate, and wherein the optical plate is electrically grounded through the transparent electrode.

6. The dust removal camera according to claim 1, wherein the optical plate is subjected to anti-static processing.

7. The dust removal camera according to claim 1, wherein the end portions of the surface of the optical plate along which the piezoelectric bodies respectively extend are parallel to each other.

* * * * *